April 22, 1947. G. E. HOWARD 2,419,450
INTERNAL COMBUSTION MOTOR
Filed Feb. 21, 1945 5 Sheets-Sheet 1

INVENTOR
George E. Howard
*Archworth Martin*
ATTORNEY

April 22, 1947.  G. E. HOWARD  2,419,450
INTERNAL COMBUSTION MOTOR
Filed Feb. 21, 1945  5 Sheets-Sheet 3

INVENTOR
George E. Howard
BY Archworth Martin
ATTORNEY

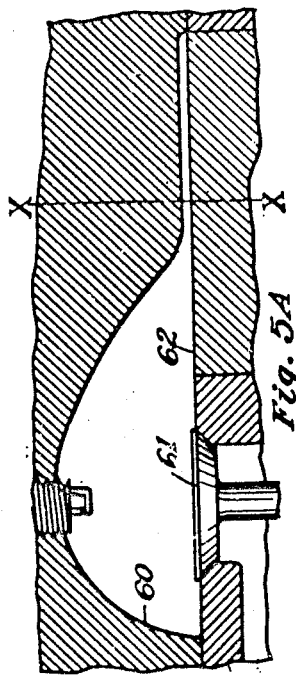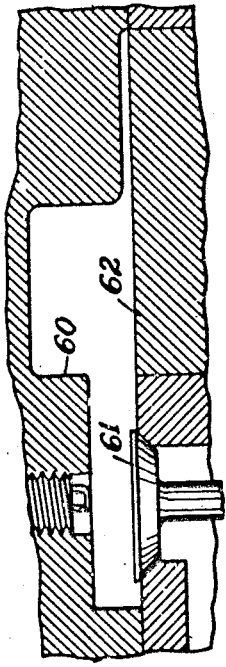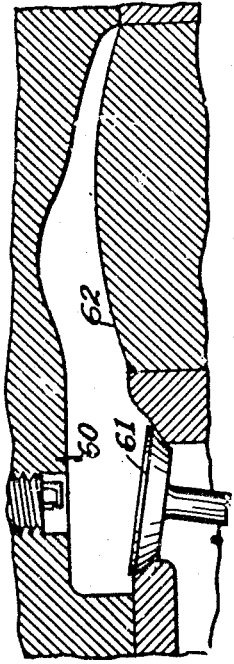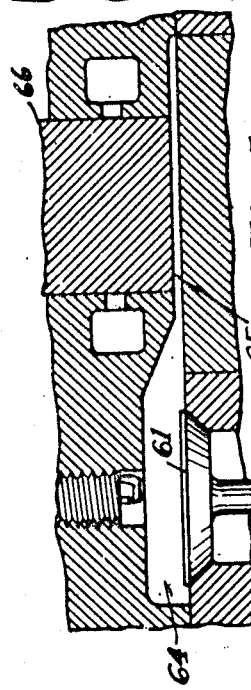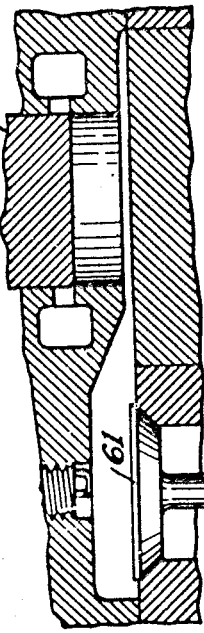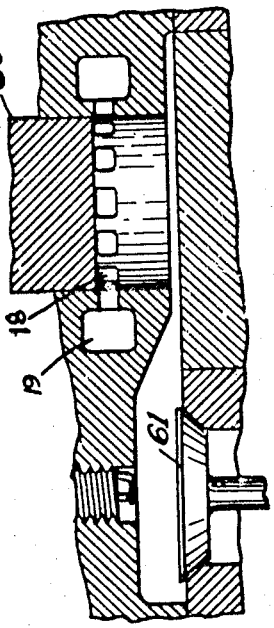

April 22, 1947.  G. E. HOWARD  2,419,450
INTERNAL COMBUSTION MOTOR
Filed Feb. 21, 1945  5 Sheets-Sheet 5

INVENTOR
George E. Howard
by Ashworth Martin
ATTORNEY

Patented Apr. 22, 1947

2,419,450

UNITED STATES PATENT OFFICE 2,419,450

INTERNAL-COMBUSTION MOTOR

George E. Howard, Butler, Pa.

Application February 21, 1945, Serial No. 579,087

11 Claims. (Cl. 123—78)

My invention relates to internal combustion motors and more particularly to a means and a method for varying the volume of the compression and combustion space in a cylinder, which includes other novel features as will be hereinafter explained. This invention can be used in conjunction with the apparatus of co-pending application Serial No. 580,824, filed March 3, 1945, so as to embody both the variable combustion space and an improved manner of controlling the fuel supply to the cylinders, in a motor.

The principal object of the present invention is to provide a practical means for varying the volume of the combustion space of an engine in response to variation in the load or power developed, to save fuel especially at lighter loads.

Another object of this invention is to provide a variable combustion space whose walls are of such contour that the turbulence of the fuel mixture is so developed during compression as to reduce the time required for completion of the combustion of the fuel mixture, particularly at lighter loads with their lower compressions.

A further object is to provide, in an internal combustion engine, a variable combustion space whose contour produces extreme turbulence at the point of ignition, at low loads with lighter compression, and changing to a lesser turbulence at the sparking point, at heavier loads and higher compression.

Still another object of my invention is to provide an improved means for lubrication of a piston-like element, by the circulation of oil laden vapor within a chamber containing the element.

Figure 1:
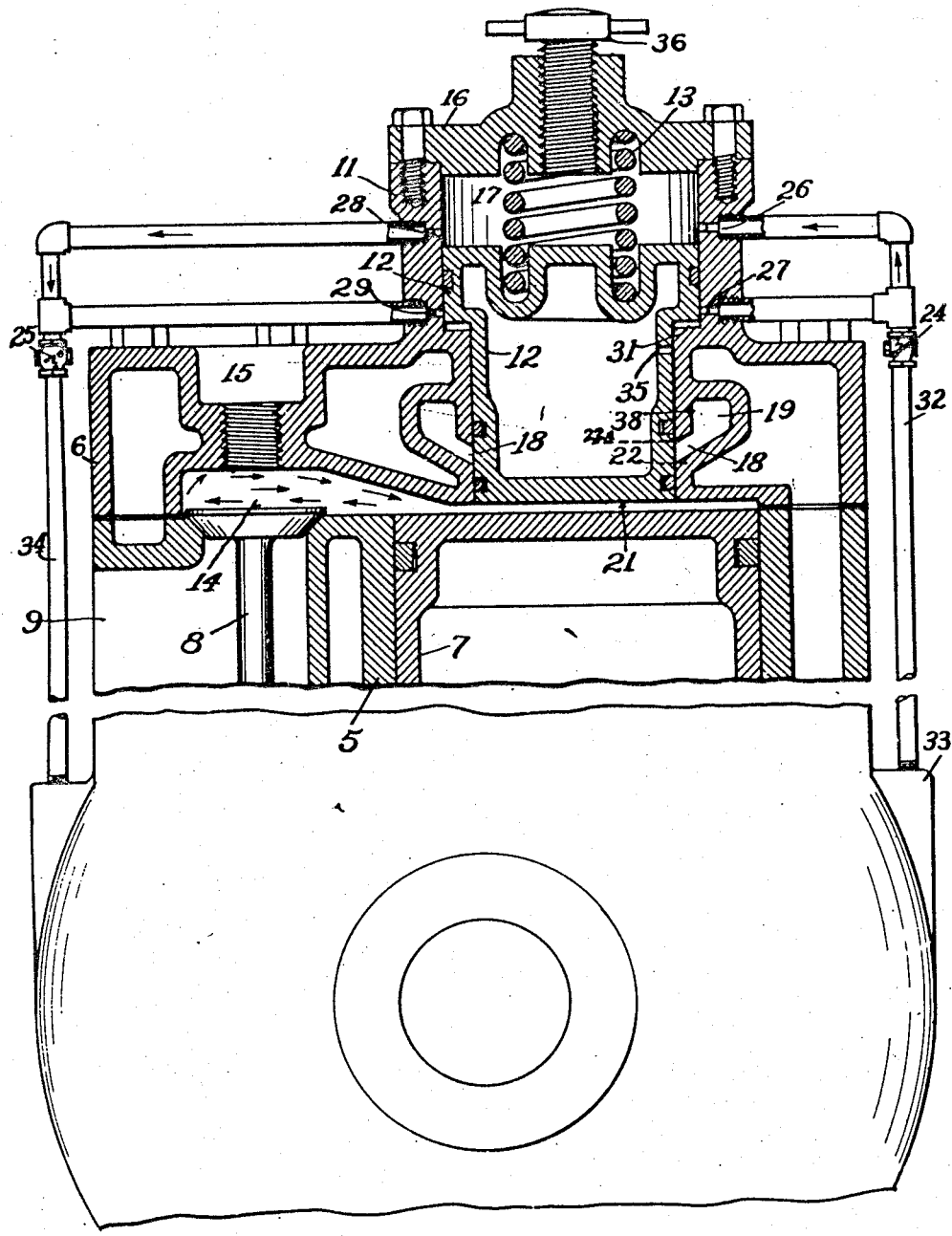
Figure 2:
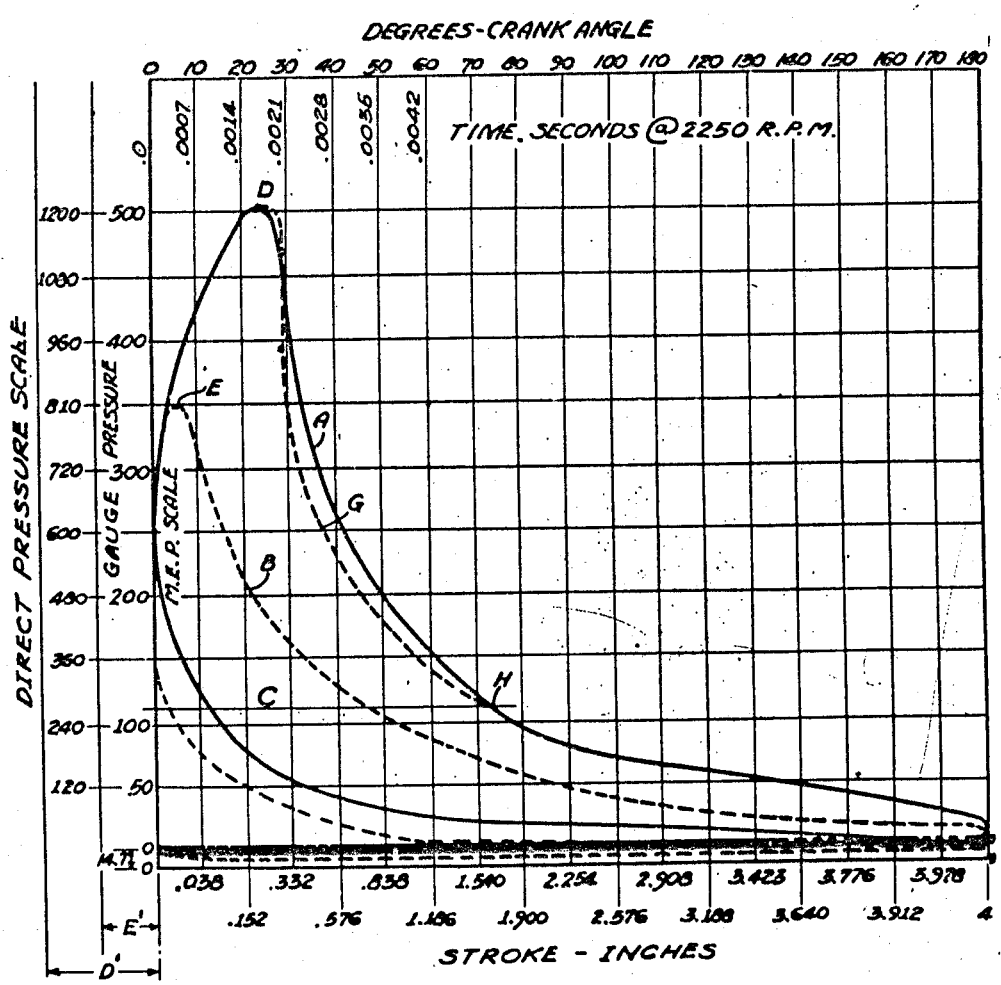
Figure 3:
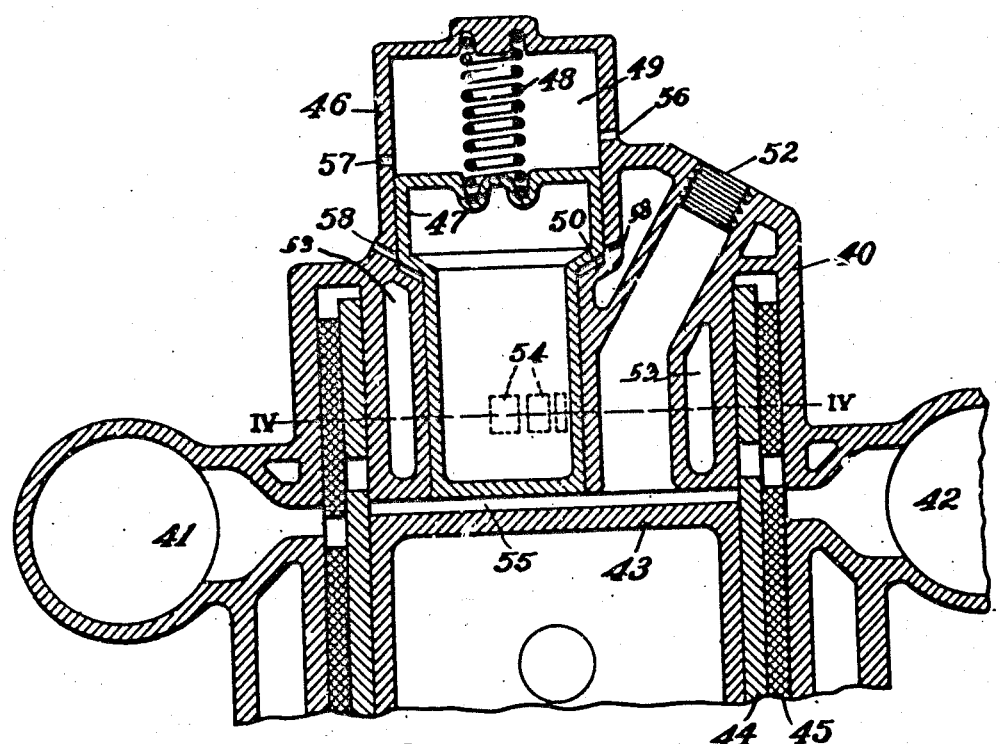
Figure 4:
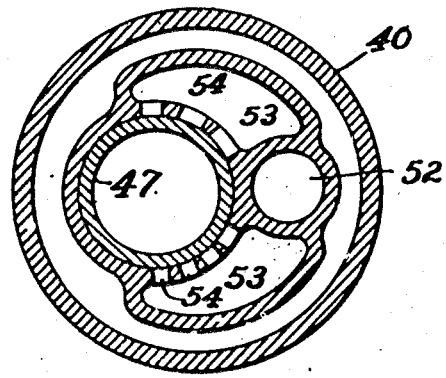
Figure 8:
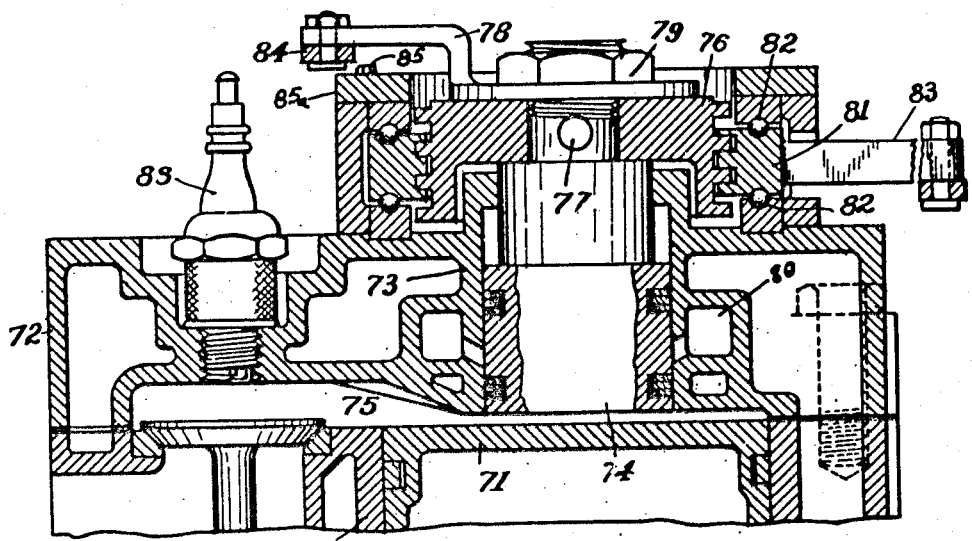
Figure 9:
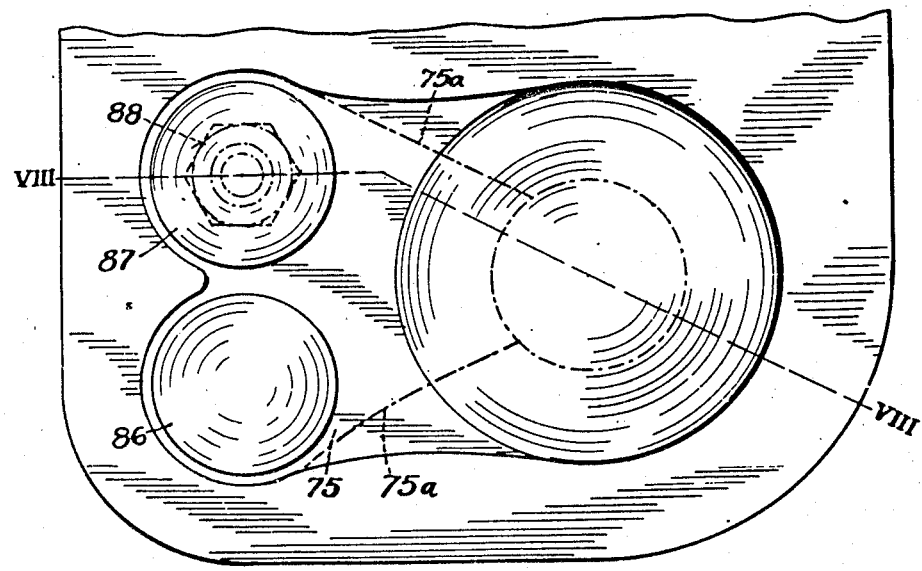

As shown in the accompanying drawings, Figure 1 is a cross sectional view through a portion of a gasoline engine of commercial size, drawn to full scale; Fig. 2 is a diagram or chart illustrating the performance of the engine cylinder and piston under various operating conditions; Fig. 3 shows a modification of the structure of Fig. 1, the invention being applied to a sleeve-valve engine; Fig. 4 is a view taken on the line IV—IV of Fig. 3; Figs. 5—5A, 6—6A, 7—7A are schematic views showing the manner in which compression spaces of varying dimensions and contours are provided by my invention, as compared to various fixed forms of compression spaces of the prior art; Fig. 8 shows still another modification of the structure of Fig. 1, on the line VIII—VIII of Fig. 9, and Fig. 9 is a schematic plan view, with various parts omitted.

Certain other devices disclosed by me and others show means for varying the compression space in a cylinder but for any certain horsepower or load, the space is fixed and remains the same during the compression stroke and the expansion stroke for the particular power or load then in use. My present preferred device not only provides the proper combustion space for any fixed load, but this space also varies during the compression and explosion strokes of the engine in a manner to achieve some useful objects not possible with the above named other disclosed means.

An added advantage of my device is that at the ends of the expansion stroke and prior to the exhaust stroke, the compression space is at a minimum for all loads. The piston in discharging the exhaust gas contents of the cylinder and compression space leaves less burned gas to be mixed with the incoming charge of fuel mixture which immediately follows the exhaust stroke. In this case there is much less exhaust gas left in the cylinder when the next incoming fuel charge is taken, compared to engines commonly used. This increases the volumetric efficiency of the incoming charge. The power and efficiency of the engine is proportional to the total volume of the incoming charge, in percent of the total volume of fuel, plus the remaining waste.

Not only does the dilution of the charge by the mixture of burned gases affect the efficiency of the engine, but it also reduces the amount of maximum power generated by any certain sized cylinder. As an illustration, a standard commercial engine may have a volumetric efficiency of 76½%, running at full throttle at 2250 r. p. m. With the reduction of burned gas volume accomplished by my device under the same conditions, the volumetric efficiency could be 87½% or more. At a speed of 4000 r. p. m., this standard engine would have volumetric efficiencies of 58% without my device and 77% with my device.

The resulting increase in the maximum horsepower developed would be about 25%, due to the greater amount of fuel mixture received in the cylinder. This percentage is further increased by reason of the greater purity of the charge due to the reduction of the amount of burned gases mixed with the new fuel mixture.

Referring first to Fig. 1 which shows only one cylinder of an L-head type automobile engine that may contain any desired number of cylinders, the numeral 5 indicates the upper portion of a cylinder that is provided with a head 6, while the piston is shown at 7. The usual poppet valves are provided, one of which is shown at 8. These valves may be of the standard type operated in the usual manner from cam shafts, to admit fuel mixture. The fuel mixture may be supplied either through the use of a conventional throttle valve, or by the methods and means disclosed in my application above referred to.

A chamber 11 is provided in or on the cylinder head 6 and contains a plunger or piston 12 that is reciprocable therein. A spring 13 yieldably holds the plunger 12 in its lowermost position against pressures during compression strokes of the piston 7 at predetermined loads.

At light loads, 85% to 90% of the volume of the charge is compressed into the space 14 which has a limited amount of surface, being particularly confined to the valve chamber. The distance from the spark plug at 15 to the extreme boundary of this space is short and will cause a rapid flame travel upon ignition which completes the combustion (over 90%) of the charge very rapidly. The compression produces a turbulent flow or movement of fuel mixture, as indicated by the arrows in the space 14, owing to the shape of the space whose top wall slopes downwardly toward the piston and whose side walls taper inwardly, which further facilitates rapid combustion rate. The plunger 12 is opposed in its upward travel by the spring 13 which opposes the force of compression.

At the light loads, the spring may be set so as to have an initial force greater than the force exerted upon the plunger at the time of maximum compression. The charge is then fired and the plunger does not move until the force of the explosion is greater than the combined counter forces including that exerted by the spring 13. At heavier loads, these counter forces will be overcome by the force of compression of the engine piston previous to firing.

Between the plunger 12 and the cap 16 is a space which acts as a further resistance to the upward movement of the plunger. The compression of the spring 13 increases equally for each increment of upward travel of the plunger. The explosion, however, of the charge is very rapid. In order to control the upward travel of the plunger to effect the purpose of this invention, the compression space at 17 progressively increases its resistance in a rapidly accelerating degree.

At the high speed at which automobile engines are operated—averaging more than 2000 R. P. M.—there will be also another resistance to the upward movement of the plunger, in the inertia of the plunger to any change from a position of rest to a position of motion. This force of inertia even with a comparatively light piston is very great at these speeds. The amount of such motion is proportional to the square of the time in which this force is exerted. Therefore in the short time in which the explosion reaches its maximum and declines to a point where the spring force balances the explosion force within the cylinder, this inertial resistance to motion is so great that the present design Figure 1, causes an upward motion of only 1/32 of an inch at a speed of 2250 R. P. M. at 1/4 load.

When however, a heavier charge is drawn into the cylinder, the compression is greater, the plunger 12 starts to move upward before the explosion takes place, the explosion is much heavier and the time of completing the maximum pressure of explosion is much longer. Therefore, the plunger moves upward a greater amount as the amount of fuel mixture drawn into the cylinder is increased. This not only gives a greater space, but owing to the longer time involved, this space is increased by a larger downward travel of the main engine piston 7.

As the explosion of the fuel mixture reaches its maximum pressure, the plunger 12 in traveling upward uncovers ports 18, which adds to the compression or combustion space, the space 19.

As the piston 7 descends, the pressure in the cylinder 5 rapidly falls, and for a major percent of power stroke, the upward pressure of the plunger 12 is less than the downward pressure exerted by the spring 13 and the pressure in the buffer space 17. This causes the plunger 12 to descend to the position shown in Fig. 1 before the power or expansion stroke is completed. The compression space 14 is less than half the maximum space during the explosion stroke. The next upward or exhaust stroke discharges all the exhaust gas except that remaining in space 14.

As this is less than half the amount that remains in an engine which has a fixed compression space or with a compression space proportioned for maximum load, it is obvious:

1st. That the next charge will be approximately equal to the displacement of the piston 7, plus the remaining exhaust gases in the combustion space. As the exhaust gases have more than atmospheric pressure and the pressure within the cylinder 5 has subatmospheric pressure or vacuum at the completion of the fuel supply stroke, the burned gas will expand to the vacuum pressure and thereby reduce the amount of fuel mixture.

2nd. That as there will be only one-half the usual volume of burned gas, its expansion will correspondingly be less and the fuel mixture drawn in by displacement of the piston 7 will be increased by that much.

As power is directly proportional to amount of fuel intake, the device of Fig. 1 will thus give additional maximum power. This will be increased still more by the greater purity of fuel mixture, since burned gases mixed with fuel supply reduce power proportionally to their percentage in the combined mixture.

The operation of the device in Fig. 1 for high speed automobile engines is subject to definite limitations. I have discovered that certain proportions should be maintained as to weights, areas, pressure, etc., in order to achieve efficient operation.

The displacement area of the plunger 12 should be not more than one-half of the area of the engine piston, and its range of movement to give the proper volume and to provide the proper shape for effective combustion should be less than 30% of engine stroke.

The weight of the displacement plunger 12 should be, for efficient operation, not more than one pound for each inch of engine cylinder diameter.

The travel of plunger 12 between positions 21 and 22 should not exceed 30% of engine piston stroke.

The distance between the top of the plunger 12 and the cap 16 should be twice or more the distance between 21 and 22.

As shown in the drawing, the initial space 14 is 60% or less of the total compression volume. Compression space between positions 21 and 22 is less than 30% of total compression volume. The total area of the ports 18, measured in square inches, is not less than 4% of the number of cubic inches in the auxiliary chamber 19 whose capacity may constitute up to 50% of the total available compression space. Explosion pressures to a disruptive degree are thereby avoided, upon combustion of a fuel charge.

More specifically, by way of example, in an engine of 7 to 1 compression ratio, wherein there is piston displacement of 5.2 inches; the initial compression space, with the plunger in its lowermost position, may suitably be 2.5 inches, the variable space in the chamber 11 (below the plunger) .6 cubic inches, and the space in the auxiliary chamber 19 would be 2.1 cubic inches. For engines of lower compression ratios, such as 6 to 1, the variable space, including the chamber 19, would be in somewhat greater proportionate volume. However, the initial space should not be more than 60% of the total possible compression volume, the variable space below the plunger 12 not more than 20% of said volume, nor the auxiliary chamber space more than 50% thereof.

The ports 18 are distributed in circumferential arrangement as in Fig. 7, and their said 4% or greater total area permits quick relief of the pressure developed beneath the plunger 12 as it is thrust upwardly. Also they provide for good flame distribution into the auxiliary chamber from the primary compression and combustion space.

I have overcome one of the objections to a movable displacement plunger by providing a proper lubricating system. The difficulty of lubricating a piston such as 12 in Fig. 1 is due to the short stroke and to the infrequency of its use for any considerable portion of that stroke. I provide check valves 24 and 25 connecting through ports 26, 27, 28 and 29 with the interior of the buffer spaces 17 and 31. The space 17 is designed to furnish a cushion or buffer to the upward movement of the plunger 12, when the thrust or the force of the explosive mixture within the engine cylinder causes too violent an upward movement of the plunger. The effect of the air pressure within the chamber 17 is to progressively increase the pressure upon the head of the plunger 12 as the head nears the cap 16. The port 26 is located above the top of plunger when it is in its lowermost position. As the piston rises, some of the air contained within 17, passes through port 28 and through a check valve 25 in the direction of arrows.

When the plunger again descends and after it passes ports 26 and 28, there will be a subatmospheric pressure in the space 17 which will cause air to pass into this space through the port 26, past check valve 24 in the direction of arrows. The pipe 32 to the valve 24 is connected to the interior of the crank case 33 of the automobile as is also a pipe 34 from the other check valve 25. When the engine is running, the oil within the crank case is in a violent motion resulting in an oil laden atmosphere within the crank case. This atmosphere passes through the space 17 and back again to the crank case. This sets up a circulatory system of oiling which gives the proper lubrication to the spring 13, the walls of the chamber 17 and the side of plunger 12. The same arrangement provides for the passage of this oil spray or vapor from the crank case to lubricate the space 31 and the lower walls of plunger 12. A drill hole 35 acts as a vent to prevent undue pressure and vacuum within the interior of the plunger 12. Another feature is a screw 36 that is intended to make additional space which is to increase space 17 if desired.

In proportioning this device, the ports 18 must be uncovered at times in order to provide access between the interior of the cylinder and space 19. In order to make provision for this, it is desirable that the plunger 12 be given sufficient stroke so that the bottom of the plunger should pass to a position 38, thereby over-running the openings 18. As the plunger rises, it meets a progressively greater compression in the space 17. This is especially marked as the last ½ of an inch of stroke is reached. By moving the screw 36, I vary the amount of this final space 17 and permit a longer upward stroke to the plunger under given conditions.

Fig. 2 shows a pressure diagram of a typical cylinder with the abscissae drawn to time in seconds and degrees of crank rotation, while the ordinates are in pressures (direct pressure and mean effective pressure scales). The two curves A and B show full power stroke and ¼ power stroke, respectively.

The initial spring tension of the spring 13 is here set at C, so that there will be no resultant force to move plunger 12 until the line C is passed. Curve A thus has more pressure and a longer time element after the pressure has passed the point C and before it reaches its maximum D. Curve B for ¼ power, on the other hand, has a shorter time and less pressure before it reaches its peak pressure at E.

As the travel of any body at rest varies as the power and as the square of the time, the difference between these two curves A and B would be about 12 to 1. As the spring 13 and the proportion of buffer chamber 17 will be arranged to properly connect space 19 with space 14 of the cylinder, during this time, it is obvious that the movement upward of the plunger 12 at the lower or ¼ power will be only 1/12 of the amount of travel for the full power (curve A).

In Fig. 2, diagram A shows a rapid drop after passing maximum pressure point D. The plunger 12 (Fig. 1) should be at its greatest distance from its lowermost position at D (except for its overrun). At or near to this point D, the upward movement of the plunger should be rapidly accelerating, otherwise the explosion pressure at full load would be too great, due to the inertia of the plunger 12, and there would be an action like a plugged gun, through failure to provide enough volume for the explosion to expand.

As the pressure after passing D (Diagram A) drops about as fast as it rose, it is obvious that a large amount of kinetic energy is stored in the plunger at or near position D. As acceleration and deceleration forces balance, it is obvious that if the explosion force and the combined resisting forces of the spring and in the buffer chamber 17 balanced at this point, the plunger 12 will continue upward, and thus increasing the combustion space until the forces of deceleration are sufficient to bring the piston to a state of rest in its upper position.

The upward travel has two phases, acceleration through excess of cylinder pressure over forces of resistance (spring 12 and buffer) for a certain distance and for a certain time until the excess of resistance forces over cylinder pressure are sufficient to decelerate the upper travel. At some point below D, during the upward travel of the plunger 12, there will be a balancing of the engine cylinder forces and the resistance forces (spring and buffer.) Since at this point the plunger has acquired kinetic energy, it will overrun or pass the point of balance. For efficiency of operation, the overrun of ports 18, Fig. 1 should be as short as possible.

The resistance forces for this period of overrun must be greater than for the acceleration period, to shorten the overrun. The explosion pressures in the engine cylinder are about the same, for a considerable distance before and after point D. These pressures in the engine cylinder are resisted by the spring and buffer and the force of acceleration, before reaching the point D during the upward movement. Past that point, it is the spring and buffer forces that must resist the engine cylinder pressure and the force of deceleration, until completion of the upward travel of the plunger.

The line D—A—H is continued to the left above the upper 0—0 line, as represented by a series of long dashes, and is continued back toward the right as a full line; while the line E—B is continued above this 0—0 line by a series of short dashes and is continued to the right below the 0—0 line, as represented by the short dashes.

Again referring to Fig. 2, the clearance for the diagram E is indicated at E' and the clearance for the diagram D is indicated at D'.

While the spring force is equal for equal increments of upward movement of the piston 12, the resistance of the buffer increases relatively faster for a similar upward travel. As an example, the buffer pressure at the end of the first ⅛" of travel of the plunger 12, using the proportion of parts shown in Fig. 1, would be 0. For the ⅛" past point 22a, the pressure would be over 200. This would reduce the travel of deceleration relative to acceleration. For example, the deceleration may be for only ⅓ of the distance of the upward travel of the plunger.

When downward movement of the plunger begins, the excess pressure above the plunger is so great that the plunger starts with quite rapid acceleration and attains a very high speed within a short distance. The deceleration of the plunger will be of much greater length, and it will finally come to rest at line C where it is seated.

The change in the pressure curve from D to H (Fig. 2) would thus be only slightly different from the curve as shown in full lines and could follow the dotted line G to H and thereafter follow the original line to point of exhaust valve opening. This would give, the distribution of pressure found to be desirable for engines of this speed at maximum power (A, Fig. 2).

As oil vapor and air are drawn into the chamber 17, too high pressure and temperature therein would cause an explosion therein and even in the space 31. The diameter of the upper end of piston 12 can be proportioned to avoid this. Also the ports 26, 27, 28 and 29 could be so placed as to reduce this danger. For example, if the ports are set higher, there will not be as great air pressure above the plunger, but the spring will be compressed to a greater extent.

The pressure in the spaces at 17 and 31 should not be more than 500 lbs. per square inch, since too high pressures may cause explosion of the oil vapor.

Various spring strengths may be used but they also have limits for their successful operation. The initial pressure of the spring 13 should be not less than 20% of the upward pressure exerted on the plunger 12 at the time of maximum explosion pressure. The resistance of the spring to compression is such that for each inch of compression its resistance is not more than three times the spring resistance when the plunger is in its lowermost position.

Referring now to Figs. 3 and 4, I show my invention as applied to a Knight type sleeve valve engine which comprises a cylinder 40 having an inlet at 41, and outlet at 42 and a piston 43. Valve sleeves 44 and 45 are operated in timed relation to movements of the piston 43 as is common in engines of this type. The piston head is extended to provide a chamber 46 in which a plunger 47 is operated as in the case of the plunger 12 (Fig. 1), a spring 48 serving to yieldably hold the plunger in its lowermost position and air trapping and cushioning spaces 49 and 50 being provided in the chamber 46.

The chamber 46 and its plunger are radially offset with respect to the axis of the cylinder 40 so as to provide a place at 52 for a spark plug and expansion spaces 53 having ports 54 that are uncovered by the plunger 47 under the higher pressures that are developed above the piston 43, to thereby afford communication between the compression and explosion space 55 and the compartments 53. Openings for lubricant to the interior of the chamber 46 are provided at 56, 57 and 58. Oily vapor or the like may suitably be passed through said openings or ports in the same manner as in Fig. 1.

Referring now more particularly to the showing in Figs. 5 to 7A that are illustrative of various forms and sizes of combustion space. The more rapid the combustion in an internal combustion engine, the higher the initial temperature and pressure and efficiency of the power cycle. Five main principles are involved in the operation of such an engine.

1st. Compression of mixture as high as possible within practical limits. This reduces the distance between the molecules of oxygen and fuel and thus causes complete combustion quicker.

2nd. Turbulence of the mixture at the time and point of ignition. This is a complex phenomena caused by a stream of relatively small section impinging on a body or stream of relatively large section. This section creates a more uniform mixture and assists in converting the atomized fuel into a vapor. The rapidity of combustion is directly proportional to the degree of turbulence. Experimentally it has been determined that combustion is completed when the piston reaches a certain down position at a certain speed. When the speed was doubled, the combustion was completed at the same position or in one-half the time. The speed of combustion and degree of turbulence had both doubled.

3rd. The temperature of the mixture especially at the point of ignition. Combustion is more rapid with hot than colder mixtures.

4th. The distance the flame must travel from ignition point to furthest point in combustion space.

5th. Circulation of currents especially in the vicinity of the ignition point. Flames travel faster with currents than in dead spaces or against the current. This is similar to the travel of a grass fire with or against the wind.

Figs. 5A, 6A and 7A show in full scale a cross section of three different designs embodying certain of these principles. 60 represents cylinder head, 61 one of the valves and 62 the piston of an L-head 4-cycle automobile engine.

Fig. 5A is called a turbulence design. The piston is at the top and has squeezed the charge into a half globular space covering part of cylinder and valve space. The approach of the piston 62 to the cylinder head 60 at the right of the line X—X progressively thins the stream of mixture and increases its velocity into the final combustion space.

This, together with the equidistant space from ignition point, causes very rapid combustion and high efficiency at full load. At lower loads this is a disadvantage as a larger combustion space ratio is necessary to prevent knocking and the residual exhaust gas unduly dilutes the incoming smaller charge of fuel; the compression pressure is lower and turbulence is much reduced. The net result is an increase in efficiency at full load and a decrease at average load, thus actually reducing the miles per gallon as compared to a more conventional engine.

Fig. 6A shows the Ricardo or shock absorber type of combustion space which permits a smaller combustion space and higher compression. To this extent it helps somewhat at light loads, through higher compression and a smaller proportion of burned exhaust gases to mix with incoming charge. This advantage is nullified, as the speed of combustion already slowed to prevent knocking at full loads is reduced so low at the average load that the net result is again increased in efficiency at full load and decreased at light load.

Fig. 7A is a section drawn nearly to full scale of a modern commercial engine's compression space. This is a compromise embodying some of the features of types 5A and 6A and any advantage would be for the full or maximum power output. Like types Figs. 5A and 6A, it is inefficient at average load and lower outputs, owing mainly to low compression, large cooling surface ratio to fuel input and long distance between ignition point and substantial volumes of the mixture body.

If the advantages of each of these types could be combined, a greater efficiency at all loads could be achieved. This would require extreme variation in the size and contour of the compression space, which is impossible with a rigid iron casting.

Figs. 5, 6 and 7 show nearly full scale sections of the compression space which I employ in Fig. 1. As this invention belongs to the type known as variable compression engines, where certain movable parts are used to maintain constant compression by varying compression in proportion to fuel input, it is neither desirable nor practical to maintain constant compression exactly over the entire range of load. Especially is this true of the L-head engine for which this invention is especially suited.

In this type of engine space must be left for opening of valves to admit maximum fuel input and the section of the passage between valve space and cylinder must be sufficient to admit fuel and discharge combustion products, for maximum speed and power. This requires about 50% of the total compression space at full power and would give maximum compression at approximately half load. As over 90% of the time, the power required to meet road conditions is less than 20% of full load, compression alone would not be sufficient to realize the best fuel economy at the average load which is the major object of this invention.

Other factors above named, namely turbulence, segregation of compression space with a maximum cubic space and minimum wall surface for charge, a hot surface to surrounding walls and a minimum travel of flame from ignition point to final combustion point are necessary for best possible efficiency. My novel combination of means provides a variable combustion space that not only varies the amount but also the contour or shape of this space in a manner to meet the best combustion conditions from idling to 80% of full load. Likewise it provides for full load with a minimum decrease in efficiency as compared to engines designed solely to reach maximum efficiency at full load.

Fig. 5 shows the compression space as confined to 64 and 65. Space 64 constitutes over 80% of the volume, and the spark plug is preferably placed over the exhaust valve (the hottest portion of engine) and has a minimum distance for flame to travel to complete combustion; secures extreme turbulence and rotary currents in space 64, cooling area a small percentage of volume 64, it will produce efficiency at fairly low compression and use of the above named factors. It is a strictly turbulence type like Fig. 5A but more efficient at low loads than any other type. The turbulence-producing volume (piston displacement) is over 10 times the volume of the firing chamber 64. This combustion space contour will be used for loads from idling to approximately 30% of full load.

The piston 66, Figs. 5, 6 and 7 is movable, changing combustion spaces and contours by means disclosed in various other figures, to change from the turbulence, low compression type of Fig. 5 to the higher compression of the Ricardo or shock absorber type of combustion space of Figs. 6 and 6A while additional fuel is supplied from 30% to 80% of full load. Fig. 6 corresponds in contour and function to Fig. 6A described above.

The transition from turbulence type Fig. 5 and 5A to Ricardo 6 and 6A is gradual and conforms to the increase in fuel and power and insures a smooth running engine.

The functional change operates as follows:

At low power, compression is low, turbulence high, Fig. 5; compression increases, turbulence decreases to Fig. 6. As both compression and turbulence are efficiency producing factors, their balance is maintained to produce the maximum possible efficiency throughout this range of power possible with the limitation of design imposed by this type of engine.

Fig. 6 develops sufficient power for 92% of the average range of driving conditions. However, while maximum power is only occasionally used, it must be provided for. Additional compression space must be provided and this is provided in my invention by what is known as stage variation as opposed to gradual variation. Fig. 7 shows the addition of a stage variation for developing full power.

In Figs. 8 and 9, I show a manually operated device for varying the combustion and compression space in the engine cylinder. The engine cylinder 70 contains the usual engine piston 71 and is provided with a cylinder head 72 which has formed therein a cylindrical chamber 73 in which a piston-like plunger 74 may be raised to provide compression space 80 additional to or in enlargement of the space 75 whose sides slope toward the zone above the engine piston, as shown by lines 75a of Fig. 9.

At its upper end, the plunger 74 has a screw-threaded stem to which a threaded collar 76 is fastened by a pin 77. An arm 78 has a washer-like body portion that is securely clamped to the collar by a nut 79. A ring 81 has threads engaging the collar threads and is supported for rotative movement on the cylinder head, between anti-friction bearings 82. These parts are held in assembled relation by screws 85 that extend through the top plate 85a and into the cylinder head 72.

Oscillatory or rotative movements of the ring 81 and the collar 78 serve to raise and lower the plunger 74 to vary the combustion spaces above the piston 71. The ring 81 is operated by an arm 83 which may suitably be connected to the accelerator pedal of an automobile so that as the pedal is operated to vary the amount of fuel supplied to the engine cylinder, the plunger will be moved to change the volume of the combustion space in accordance with change in fuel supply. In order to provide for greater range of vertical movement of the plunger, than that afforded by angular movement of the arm 83, the arm 78 will similarly be operated from the accelerator pedal, by a link 84, connected to the pedal, the arm 78 being moved clockwise when the arm 83 is being swung counterclockwise, and vice versa.

In this arrangement as in the case of Fig. 1, the combustion space will extend over the inlet and outlet valves 86 and 88 respectively, of the engine cylinder and to the zone above the engine cylinder 71, the spark plug 88 being located above the exhaust valve 87.

I claim as my invention:

1. The combination with an internal combustion engine having a piston and cylinder and provided with a crank case containing lubricating oil, of an auxiliary cylinder communicating with the engine cylinder, a piston movable therein, means operable through reciprocatory movements of the second-named piston, for drawing oil vapors from the crank case and directing them through the auxiliary cylinder at points where its wall and its piston will be lubricated thereby.

2. The combination with an internal combustion engine having a piston and cylinder and provided with a crank case containing lubricating oil, of an auxiliary cylinder communicating with the engine cylinder, a piston movable therein, means operable through reciprocatory movements of the second-named piston, for directing oil vapors from the crank case through the auxiliary cylinder at points where its wall and its piston will be lubricated thereby, the said means comprising a pair of pipes leading from the crank case to the interior of said cylinder, one of which is provided with a check valve opening toward the cylinder and the other of which has a check valve opening away from the cylinder.

3. The combination with an internal combustion engine having a piston and cylinder, of a chamber communicating at one end with the compression and combustion space in the cylinder and having a plunger movable therein to open and close the said end and thereby provide a variable compression space for the engine, means yieldably resisting movement of the plunger toward the other end of the chamber, and an auxiliary chamber located to one side of but communicating with the said chamber through ports located outwardly of the innermost position of the plunger, and in position to be covered and uncovered by the plunger during movements of the plunger through changes in cylinder pressures, the total square inch area of the port openings being not less than 4% of the number of cubic inches of space in the auxiliary chamber, and the volumetric capacity of the compression space in the auxiliary chamber being not less than 20% of the total possible compression volume.

4. The combination with an internal combustion engine having a piston and cylinder, of a chamber communicating at one end with the compression and combustion space in the cylinder and having a plunger movable therein to open and close the said end and thereby provide a variable compression space for the engine, means yieldably resisting movement of the plunger toward the other end of the chamber, and an auxiliary chamber located to one side of but communicating with the said chamber, through ports located outwardly of the innermost position of the plunger, and in position to be covered and uncovered by the plunger during movements of the plunger through changes in cylinder pressures, the total square inch area of the port openings being not less than 4% of the number of cubic inches of space in the auxiliary chamber, the ports being arranged in an annular path that is coaxial with the plunger, and the volumetric capacity of the compression space in the auxiliary chamber being not less than 20% of the total possible compression volume.

5. The combination with an internal combustion engine having a piston and cylinder, of a chamber communicating at one end with the compression and combustion space in the cylinder and having a plunger movable therein to open and close the said end and thereby provide a variable compression space for the engine, means yieldably resisting movement of the plunger toward the other end of the chamber, and an auxiliary chamber located to one side of but communicating with the said chamber, through ports located outwardly of the innermost position of the plunger, and in position to be covered and uncovered by the plunger during movements of the plunger through changes in cylinder pressures, the volumetric capacity of the auxiliary chamber being not greater than 50% and not less than 20% of the maximum available compression space.

6. The combination with an internal combustion engine having a piston and cylinder, of a chamber communicating at one end with the compression and combustion space in the cylinder and having a plunger movable therein to open and close the said end and thereby provide a variable compression space for the engine, means yieldably resisting movement of the plunger toward the other end of the chamber, and an auxiliary chamber located to one side of but communicating with the said chamber, through ports located outwardly of the innermost position of the plunger, and in position to be covered and uncovered by the plunger during movements of the plunger through changes in cylinder pressures, the maximum effective displacement by the plunger being not more than 30% of the maximum available compression space, and the volumetric capacity of the compression space in the auxiliary chamber being not less than 20% of the total possible compression volume.

7. The combination with an internal combustion engine having a piston and cylinder, of a chamber communicating at one end with the compression and combustion space in the cylinder and having a plunger movable therein to open and close the said end and thereby provide a variable compression space for the engine, means yieldably resisting movement of the plunger toward the other end of the chamber, and an auxiliary chamber located to one side of but communicating with the said chamber, through ports located outwardly of the innermost position of the plunger, and in position to be covered and uncovered by the plunger during movements of the plunger through changes in cylinder pressures, the initial compression space constituting not more than 60% of the maximum available compression space, and the volumetric capacity of the compression space in the auxiliary chamber being not less than 20% of the total possible compression volume.

8. The combination with an internal combustion engine having a cylinder and piston, of a chamber communicating at one end with the compression and combustion space in the cylinder and having a plunger movable therein to open and close the said end and thereby provide a variable compression and combustion space for the engine, means yieldably resisting movement of the plunger toward the other end of the chamber, and an auxiliary chamber located to one side of but communicating with the other chamber, through ports located outwardly of the innermost position of the plunger and in position to be covered and uncovered by the plunger during movements of the plunger through changes in cylinder pressures, the weight of the plunger being not substantially more than one pound for each inch of piston diameter and the plunger having an area not substantially greater than one-half the area of the piston, the said ports being so located that when the plunger is moved by pressures in the cylinder, its travel from its innermost position to the point at which it uncovers the ports will result in an increase less than 30% in the volume of the compression space, and the volumetric capacity of the compression space in the auxiliary chamber being not less than 20% of the total possible compression volume.

9. The combination with an internal combustion engine having a cylinder and piston, of a chamber communicating at one end with the compression and combustion space in the cylinder and having a plunger movable therein to open and close the said end and thereby provide a variable compression and combustion space for the engine, means yieldably resisting movement of the plunger toward the other end of the chamber, an auxiliary chamber located to one side of but communicating with the other chamber, through ports located outwardly of the innermost position of the plunger and in position to be covered and uncovered by the plunger during movements of the plunger through changes in cylinder pressures, the weight of the plunger being not substantially more than one pound for each inch of piston diameter and the plunger having an area not substantially greater than one-half the area of the piston, the said ports being so located that when the plunger is moved by pressures in the cylinder, its travel from its innermost position to the point at which it uncovers the ports will result in an increase less than 30% in the volume of the compression space, and means providing for outward movements of the plunger from its innermost position for a distance of not less than twice that which it moves from its innermost position to the uncovering of said ports, under approximately full load conditions, and the volumetric capacity of the compression space in the auxiliary chamber being not less than 20% of the total possible compression volume.

10. The combination with an internal combustion engine, which has a fuel-supply valve and a cylinder with a piston reciprocable therein, and having a compression and combustion space in its outer end, of an expansion chamber communicating at its inner end with the compression and combustion space in the cylinder, a plunger movable in the chamber, means yieldably holding the plunger in position to close the said end of the chamber, the outer end of the chamber being closed to confine air that serves as a pneumatic cushion for the plunger when it is moved by explosions in the cylinder, the inner end of the plunger having an area not substantially greater than one-half the area of the piston and the said yieldable force and the weight of the plunger being such that the range of movement of the plunger under explosive forces in the cylinder, at approximately one-half of maximum load, is such that the resulting increase in compression and combustion space will be equal to approximately 20% of the maximum compression and combustion space under full load conditions, and an auxiliary expansion chamber at one side of and communicating with the first-named chamber and having ports covered and uncovered by the plunger and so located that they will be opened when the plunger has moved a distance to increase the compression and combustion space by from 20% to 30% of the total, the said auxiliary chamber serving to constitute not more than 50% and not less than 20% of the total maximum compression volume of the total compression and combustion space, under greater than one-half maximum load.

11. The combination with an internal combustion engine which has a fuel supply valve and a cylinder with a piston reciprocable therein and having a compression and combustion space in the outer end of the cylinder, of means forming a variable compression and combustion space in communication with the first-named space, an auxiliary chamber forming a fixed combustion space, and means operable under explosive forces of predetermined degree within the cylinder, for increasing the volume of the variable space and establishing communication between the third-named space and the other two spaces, the last named means being unaffected by the pressure in the third named space, the volumetric capacity of the compression space in the auxiliary chamber being not less than 20% of the total possible compression volume.

GEORGE E. HOWARD.

REFERENCES CITED

The following references are of record in the file of this patent:

UNITED STATES PATENTS

| Number | Name | Date |
|---|---|---|
| 1,609,686 | Blanding | Dec. 7, 1926 |
| 2,120,012 | Andreau | June 7, 1938 |
| 752,936 | Vogt | Feb. 23, 1904 |
| 1,089,194 | Fagerholm | Mar. 3, 1914 |
| 1,167,023 | Schmidt | Jan. 4, 1916 |
| 2,215,986 | Stevens | Sept. 24, 1940 |
| 640,675 | Lewis | Jan. 2, 1900 |

FOREIGN PATENTS

| Number | Country | Date |
|---|---|---|
| 15,203 | England | July 17, 1908 |
| 4,281 | France | Oct. 19, 1905 |